(12) United States Patent  
Beckman

(10) Patent No.: US 7,552,933 B1
(45) Date of Patent: Jun. 30, 2009

(54) CARGO TRAILER

(76) Inventor: Greg A. Beckman, 5639 Brietenstein La., Klamath Falls, OR (US) 97601

( * ) Notice: Subject to any disclaimer, the term of this patent is extended or adjusted under 35 U.S.C. 154(b) by 280 days.

(21) Appl. No.: 11/515,295

(22) Filed: Sep. 1, 2006

(51) Int. Cl.
*B62K 27/00* (2006.01)
(52) U.S. Cl. .................. 280/204; 280/489; 280/202; 280/282; D12/101
(58) Field of Classification Search ............ 280/489, 280/202, 204, 282; D12/101
See application file for complete search history.

(56) References Cited

U.S. PATENT DOCUMENTS

| | | | |
|---|---|---|---|
| 3,840,085 A * | 10/1974 | Smith ................ | 180/14.1 |
| 4,057,283 A | 11/1977 | Barnett | |
| 4,077,646 A * | 3/1978 | Watkins .............. | 280/204 |
| 4,536,001 A | 8/1985 | Wagner | |
| 4,729,574 A | 3/1988 | Tipke | |
| 5,041,064 A * | 8/1991 | Eickhoff et al. ....... | 475/24 |
| D326,070 S * | 5/1992 | Hollingworth, Jr. ..... | D12/101 |
| 5,520,404 A * | 5/1996 | Schulte .............. | 280/460.1 |
| 5,535,930 A * | 7/1996 | Lee .................. | 224/321 |
| D391,525 S | 3/1998 | Savitski | |
| 6,042,138 A * | 3/2000 | Shreck ............... | 280/492 |
| 6,454,289 B1 | 9/2002 | Mullins | |
| 6,575,485 B2 * | 6/2003 | Durrin ............... | 280/204 |
| 7,074,151 B2 * | 7/2006 | Thompson ........... | 475/225 |
| 2006/0001230 A1 | 1/2006 | Finch | |

* cited by examiner

*Primary Examiner*—Paul N Dickson
*Assistant Examiner*—Marlon A Arce
(74) *Attorney, Agent, or Firm*—Gerald D. Haynes; R. Keith Harrison

(57) ABSTRACT

A cargo trailer is disclosed. An illustrative embodiment of the cargo trailer includes an elongated trailer frame having a longitudinal axis, at least one wheel carried by the trailer frame and a pair of cargo container mount members carried by the trailer frame and positionally adjustable along the longitudinal axis of the trailer frame.

11 Claims, 4 Drawing Sheets

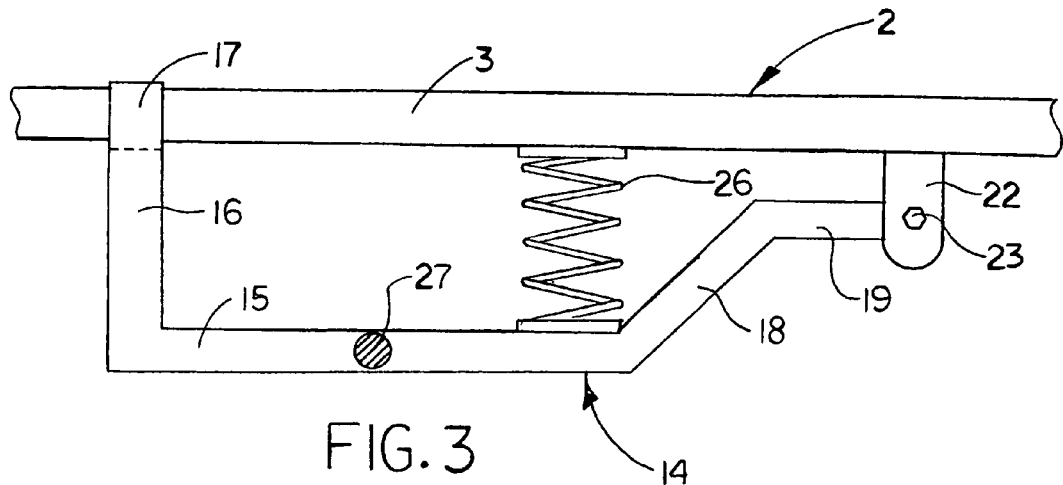
FIG. 3
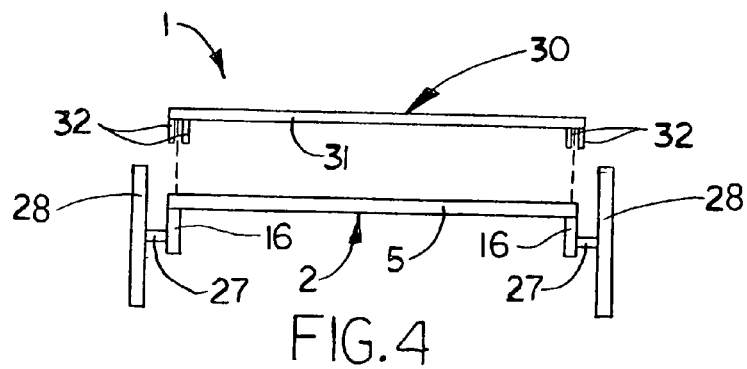
FIG. 4
FIG. 5
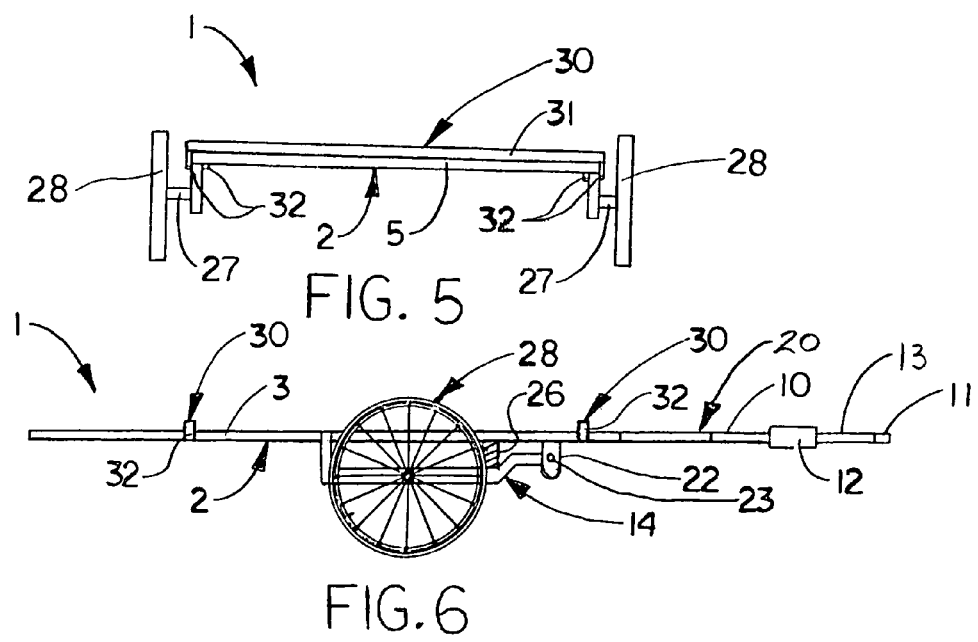
FIG. 6

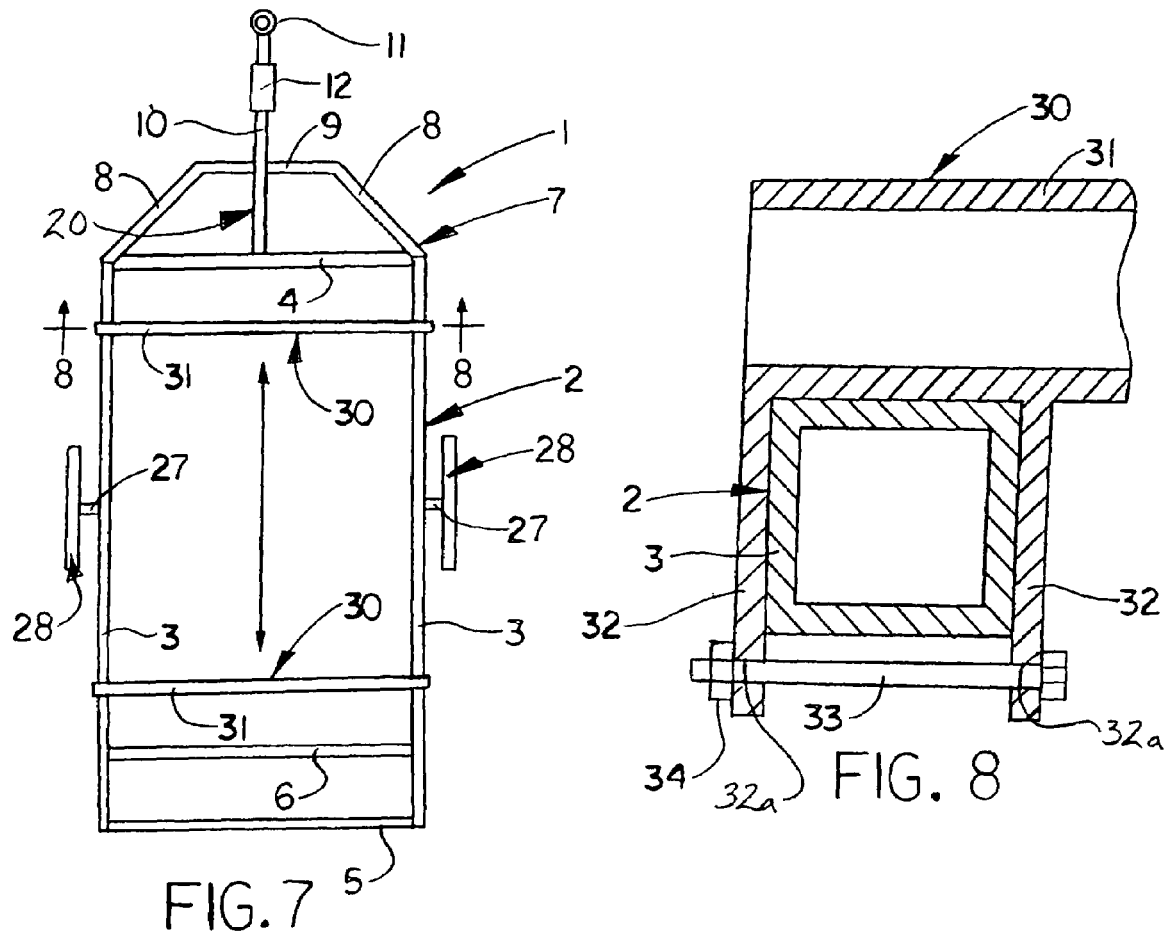
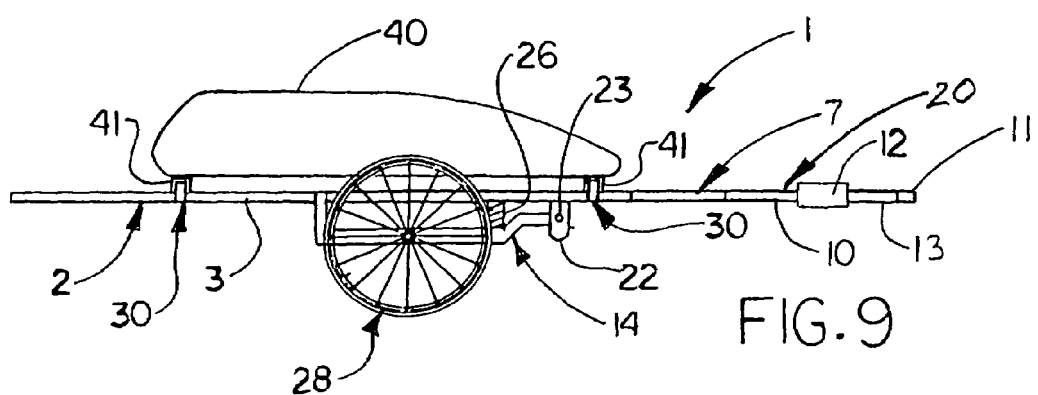

CARGO TRAILER

FIELD

The present invention relates to trailers. More particularly, the present invention relates to a cargo trailer which can be adjusted to accommodate cargo containers of various sizes.

BACKGROUND

Cargo containers are commonly used by travelers to transport additional cargo such as luggage and the like which cannot fit inside an automobile. Such cargo containers are attached to a rack which is mounted on the roof of the vehicle. However, since the cargo containers are available in various sizes, the racks must be adjustable or replaceable to accommodate different-sized cargo containers. A cargo trailer is needed which is capable of being towed by a motorcycle and can be adjusted to accommodate cargo containers of various sizes.

SUMMARY

The present invention is generally directed to a cargo trailer. An illustrative embodiment of the cargo trailer includes an elongated trailer frame having a longitudinal axis, at least one wheel carried by the trailer frame and a pair of cargo container mount members carried by the trailer frame and positionally adjustable along the longitudinal axis of the trailer frame.

BRIEF DESCRIPTION OF THE DRAWINGS

The invention will now be described, by way of example, with reference to the accompanying drawings, in which:

FIG. 3 is a sectional view, taken along section lines 3-3 in FIG. 1, more particularly illustrating a typical trailing arm suspension technique for attaching a wheel mount arm element to the trailer frame element of the cargo trailer;

FIG. 4 is a rear exploded view of an illustrative embodiment of the cargo trailer, more particularly illustrating attachment of a cargo container mount member to the trailer trailer frame;

FIG. 5 is a rear view of an illustrative embodiment of the cargo trailer, with a cargo container mount member mounted on the trailer frame;

FIG. 6 is a side view of an illustrative embodiment of the cargo trailer, with a pair of cargo container mount members provided on the trailer frame;

FIG. 7 is a top view of an illustrative embodiment of the cargo trailer, with a pair of cargo container mount members provided on the trailer frame;

FIG. 8 is a sectional view, taken along section lines 8-8 in FIG. 7, illustrating a typical attachment flange technique for attaching each cargo container mount member to the trailer frame;

FIG. 9 is a side view of an illustrative embodiment of the cargo trailer, with a cargo container provided on a pair of cargo container mount members mounted on the trailer frame.

DETAILED DESCRIPTION

Figure 1:
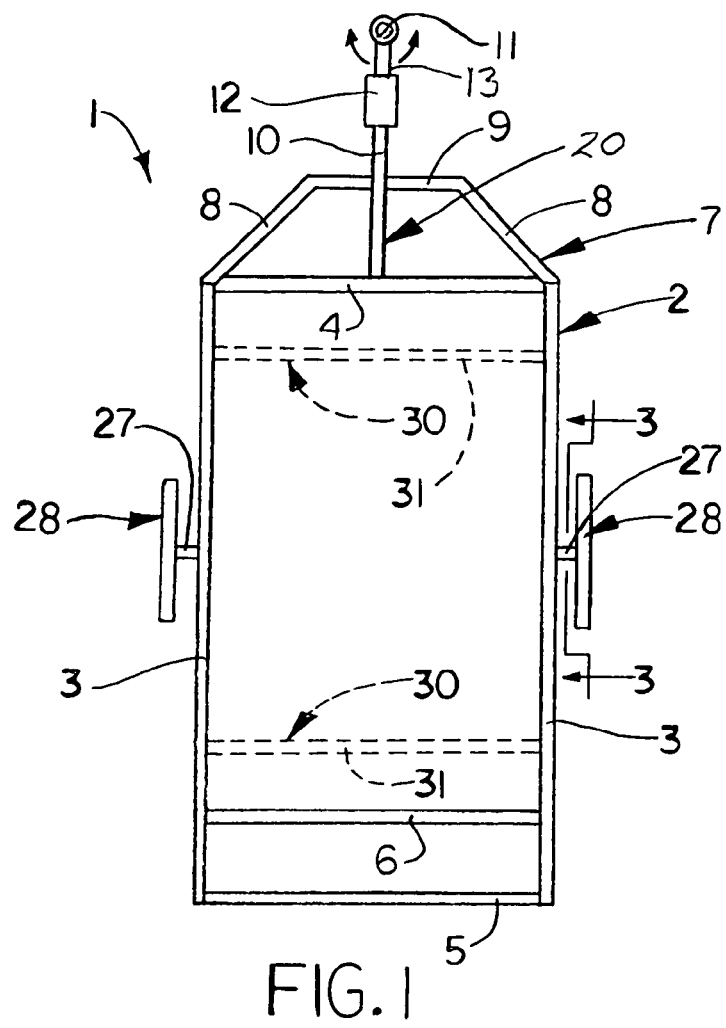
FIG. 1 is a top view of an illustrative embodiment of the cargo trailer, with a pair of cargo container mount members (shown in phantom) provided on a trailer frame element of the cargo trailer.

Referring initially to FIGS. 1-8 of the drawings, an illustrative embodiment of the cargo trailer is generally indicated by reference numeral 1. The cargo trailer 1 has a trailer frame 2 which may be, for example, steel or aluminum square tubing. The trailer frame 2 has a pair of generally elongated, parallel, spaced-apart side trailer frame members 3. A front transverse trailer frame member 4 and a rear transverse trailer frame member 5 extend between the trailer frame members 3 in spaced-apart relationship with respect to each other. A transverse frame stabilizer 6 may additionally extend between the side trailer frame members 3, typically in spaced-apart, adjacent relationship with respect to the rear transverse trailer frame member 5.

A hitch support frame 7 extends from the trailer frame 2. The hitch support frame 7 includes a pair of side hitch support frame members 8 which extends from the respective side trailer frame members 3, at the front transverse frame member 4. Each of the side hitch support frame members 8 is disposed at a generally obtuse angle with respect to the corresponding side trailer frame member 3. A cross member 9 extends between the side hitch support frame members 8. A hitch 20 is supported by the hitch support frame 7. The hitch 20 may include, for example, an elongated hitch bar 10 which extends from the front transverse trailer frame member 4. The hitch bar 10 may extend over and be supported by the cross member 9, as illustrated in FIGS. 1 and 7. Alternatively, the hitch bar 10 may be multi-segmented and welded to respective sides of the cross member 9 of the hitch support frame 2.

The hitch 20 may further include a coupling member 13 which is connected to the hitch bar 10 through a rotational coupler 12. Accordingly, as indicated by the arrow in FIG. 1, the coupling member 13 is capable of axial rotation with respect to the hitch bar 10. A hitch eye 11 is provided on the extending end of the hitch bar 10 for purposes which will be hereinafter described.

Figure 2:
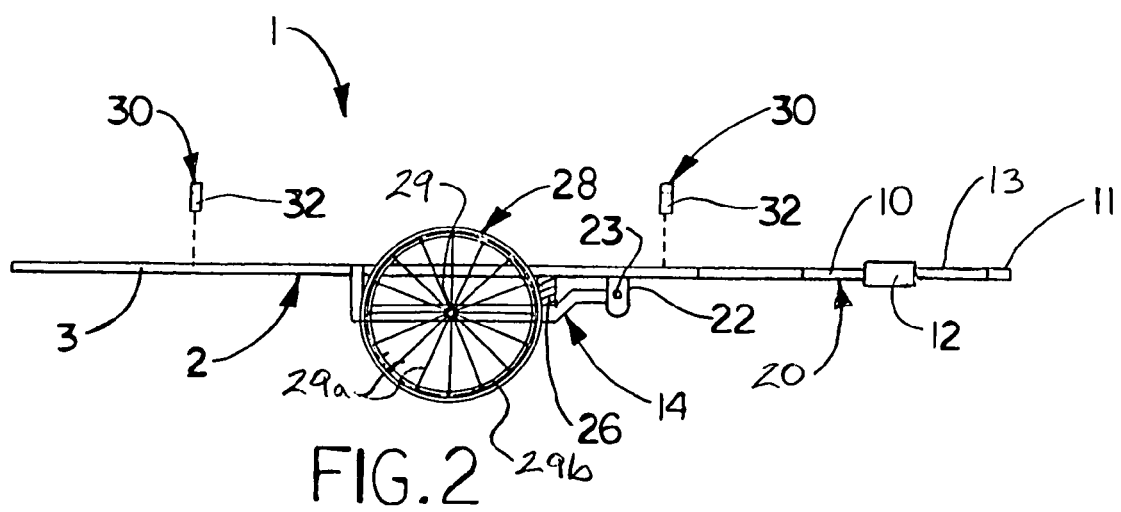
FIG. 2 is an exploded side view of an illustrative embodiment of the cargo trailer, more particularly illustrating attachment of a pair of cargo container mount members to the trailer frame.

At least one, and typically, a pair of wheels 28 is provided on the trailer frame 2. As shown in FIGS. 2, 3 and 6, each wheel 28 may be provided on a corresponding wheel mount arm 14 which is mounted on the corresponding side trailer frame member 3 of the trailer frame 2 using a trailing arm suspension technique. Accordingly, as illustrated in FIG. 3, each wheel mount arm 14 typically includes an elongated axle arm segment 15. An attachment arm segment 16 extends from a rear end of the axle arm segment 15, in generally perpendicular relationship thereto. An arm attachment sleeve 17 is provided on the end of the attachment arm segment 16, and the side trailer frame member 3 of the trailer frame 2 extends through the arm attachment sleeve 17. An angled arm segment 18 extends from a front end of the axle arm segment 15 and is disposed in at a generally obtuse angle with respect to the axle arm segment 15. A flange arm segment 19 extends from the angled arm segment 18.

A pair of adjacent, spaced-apart arm mount flanges 22 (one of which is illustrated in FIG. 3) extends downwardly from each side trailer frame member 3. The flange arm segment 19 of each corresponding wheel mount arm 14 is pivotally mounted between the arm mount flanges 22 by a pivot bolt 23. A coiled arm spring 26 is interposed between the axle arm segment 15 of each wheel mount arm 14 and the corresponding side trailer frame member 3 of the trailer frame 2. A wheel axle 27 (illustrated in section in FIG. 3) is rotatably mounted in an axle opening (not illustrated) which extends through each axle arm segment 15. Accordingly, as illustrated in FIGS. 1 and 7, each wheel 28 is mounted on the corresponding wheel axle 27. Each wheel 28 typically has a wheel hub 29 which is coupled to the wheel axle 27; multiple spokes 29a which extend from the wheel hub 29; and a wheel rim 29b which is provided on the spokes 29a. A tire (not illustrated) is mounted on the wheel rim 29b. During towing of the cargo trailer 1, which will be hereinafter described, each arm spring 26 absorbs shock as the wheel mount arm 14 pivots with respect to the arm mount flanges 22 on each side trailer frame member 3 and the arm attachment sleeve 17 moves vertically with respect to the side trailer frame member 3.

A pair of cargo container mount members 30 is provided on the trailer frame 2. Each of the cargo container mount members 30 is positionally adjustable along the longitudinal axis of the trailer frame 2. As illustrated in FIGS. 4 and 5, each cargo container mount member 30 typically includes an elongated mount shaft 31 which is typically steel or aluminum square tubing. A pair of adjacent, spaced-apart attachment flanges 32 extends from the mount shaft 31, at each end thereof. As illustrated in FIG. 8, a bolt opening 32a extends through each attachment flange 32. A mount bolt 33 extends through the aligned bolt openings 32a in each pair of attachment flanges 32 and receives a nut 34. As further illustrated in FIG. 8, each pair of attachment flanges 32 is adapted to receive each corresponding side trailer frame member 3 of the trailer frame 2. The nut 34 is tightened on the mount bolt 33 to facilitate engagement of the attachment flanges 32 against respective sides of the side trailer frame member 3 and secure the cargo container mount member 30 at a selected location along the trailer frame 2. Conversely, each cargo container mount member 30 can be adjusted along the trailer frame 2 by loosening each nut 34 on the corresponding mount bolt 33, thereby loosening engagement of each pair of attachment flanges 32 against the side trailer frame member 3 and facilitating sliding of the cargo container mount member 30 along the side trailer frame members 3.

Figure 10:
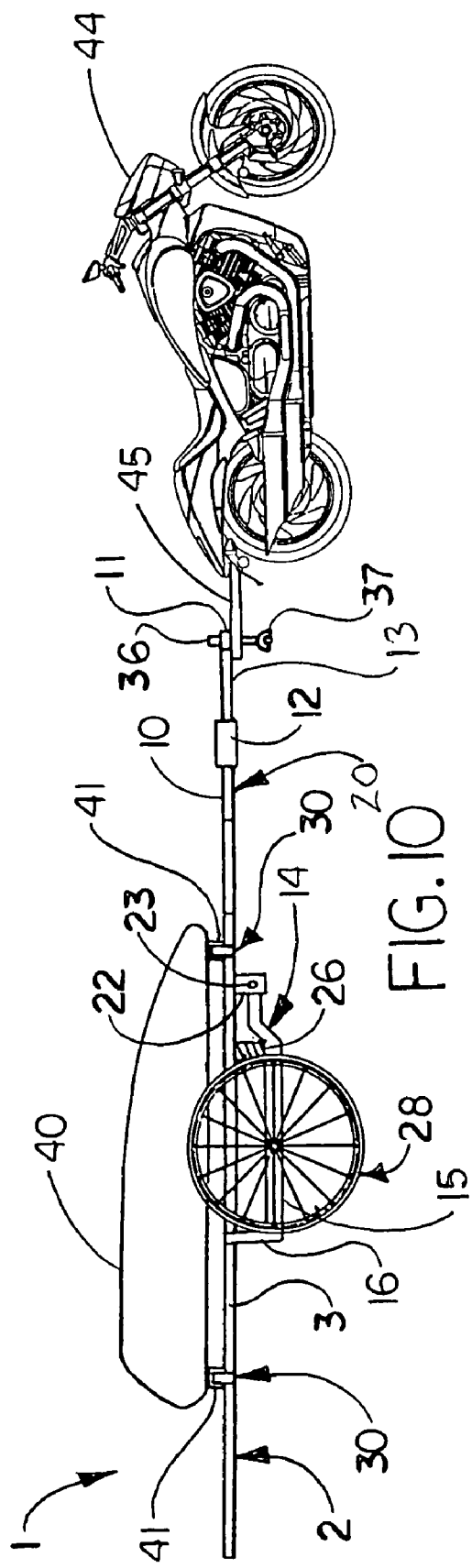
FIG. 10 is a side view of an illustrative embodiment of the cargo trailer, with a cargo container mounted on the cargo trailer and illustrating a typical technique for hitching the cargo trailer to a motorcycle.

Referring next to FIGS. 9 and 10 of the drawings, in typical application, a cargo container 40 is mounted on the trailer frame 2 of the cargo trailer 1. The cargo container 40 may be a conventional cargo container which is adapted for attachment to a roof rack (not illustrated) provided on the roof of a vehicle (not illustrated). A pair of spaced-apart attachment clips 41 is typically provided on the bottom of the cargo container 40. Normally, the attachment clips 41 are adapted for attachment to the roof rack (not illustrated) provided on the vehicle. Depending on the size and brand of the cargo container 40, the spacing of the attachment clips 41 with respect to each other varies. Accordingly, the position of the cargo container mount members 30 on the trailer frame 2 can be adjusted, typically as was heretofore described with respect to FIG. 8, to accommodate the required spacing of the attachment clips 41 on the cargo container 40. The attachment clips 41 are then detachably attached to the respective cargo container mount members 30 using conventional techniques which are known by those skilled in the art. Cargo (not illustrated) such as luggage, for example, is placed in the cargo container 40.

The cargo trailer 1 can be coupled to a motorcycle 44, as shown in FIG. 10. This may be carried out by, for example, providing a hitch receptacle 45, through which extends a shaft opening (not illustrated), on the motorcycle 44. A threaded hitch shaft 36 is extended through the hitch eye 11 on the coupling member 13 of the cargo trailer 1, after which a wing nut 37 is threaded on the hitch shaft 36. Accordingly, as the cargo trailer 1 is towed behind the motorcycle 44, the coupling member 13 is capable of pivoting about the hitch shaft 36 with respect to the hitch receptacle 45. The coupling member 13 is capable of rotating about the rotational coupler 12 with respect to the hitch bar 10. The arm springs 26 absorb road shock as the wheel mount arms 14 pivot about the pivot bolts 23 with respect to the respective side trailer frame members 3 of the trailer frame 2. After use, the cargo container 40 is detached from the cargo container mount members 30 and removed from the trailer frame 2. A replacement cargo container 40 can be attached to the trailer frame 2 by appropriate positioning of the cargo container mount members 30 on the trailer frame 2, followed by attachment of the attachment clips 41 of the cargo container 40 to the respective cargo container mount members 30, as was heretofore described.

While the preferred embodiments of the invention have been described above, it will be recognized and understood that various modifications can be made in the invention and the appended claims are intended to cover all such modifications which may fall within the spirit and scope of the invention.

What is claimed is:

1. A cargo trailer, comprising:
   an elongated trailer frame having a longitudinal axis and comprising a pair of elongated, spaced-apart side trailer frame members and a front transverse trailer frame member and a rear transverse trailer frame member carried by said side trailer frame members;
   a pair of cargo container mount members carried by said trailer frame and positionally adjustable along said longitudinal axis of said trailer frame;
   a first wheel mount arm and a second wheel mount arm pivotally carried by said side trailer frame members, respectively, of said trailer frame;
   a first arm spring and a second arm spring interposed between said first wheel mount arm and said trailer frame and said second wheel mount arm and said trailer frame, respectively;
   a first wheel and a second wheel carried by said first wheel mount arm and said second wheel mount arm, respectively; and
   wherein each of said pair of cargo container mount members comprises an elongated mount shaft having first and second ends and a first pair of spaced-apart attachment flanges carried by said mount shaft at said first end and receiving a first one of said side trailer frame members and a second pair of spaced-apart attachment flanges carried by said mount shaft at said second end and receiving a second one of said side trailer frame members, and further comprising a first mount bolt engaging said first pair of spaced-apart attachment flanges and a second mount bolt engaging said second pair of spaced-apart attachment flanges.

2. The cargo trailer of claim 1 further comprising a hitch carried by said front transverse trailer frame member of said trailer frame.

3. The cargo trailer of claim 2 wherein said hitch comprises a hitch bar carried by said front transverse trailer frame member of said trailer frame, a coupling member carried by said hitch bar and a hitch eye carried by said coupling member.

4. The cargo trailer of claim 3 further comprising a rotational coupler carried by said hitch bar and wherein said coupling member extends from said rotational coupler.

5. The cargo trailer of claim 1 further comprising a hitch support frame carried by said front transverse trailer frame member of said trailer frame and wherein said hitch is supported by said hitch support frame.

6. The cargo trailer of claim 5 wherein said hitch support frame comprises a pair of side support frame members carried by said front transverse trailer frame member of said hitch support frame and a cross member extending between said pair of side support frame members.

7. A cargo trailer, comprising:
an elongated trailer frame having a longitudinal axis and first and second side trailer frame members and front and rear transverse trailer frame members extending between said first and second side trailer frame members;
a pair of cargo container mount members carried by said first and second side trailer frame members, respectively, of said trailer frame and positionally adjustable along said longitudinal axis of said trailer frame;
a first wheel mount arm and a second wheel mount arm pivotally carried by said first and second side trailer frame members, respectively, of said trailer frame, each of said first wheel mount arm and said second wheel mount arm having a flange arm segment pivotally carried by said trailer frame, an angled arm segment extending from said flange arm segment, an axle arm segment extending from said angled arm segment and an attachment arm segment extending from said axle arm segment;
an arm attachment sleeve carried by said attachment arm segment of said first wheel mount arm and said second wheel mount arm, respectively, and wherein said first and second side trailer frame members, respectively, of said trailer frame extend through said arm attachment sleeve of said first wheel mount arm and said second wheel mount arm, respectively;
a first arm spring interposed between said first side trailer frame member and said axle arm segment of said first wheel mount arm and a second arm spring interposed between said second side trailer frame member and said axle arm segment of said second wheel mount arm; and
a first wheel carried by said axle arm segment of said first wheel mount arm and a second wheel carried by said axle arm segment of said second wheel mount arm, respectively.

8. The cargo trailer of claim 7 further comprising a hitch support frame carried by said trailer frame and a hitch carried by said hitch support frame.

9. The cargo trailer of claim 8 wherein said hitch support frame comprises a pair of side hitch support frame members carried by said first and second side trailer frame members, respectively, of said trailer frame and a cross member extending between said pair of side hitch support frame members.

10. The cargo trailer of claim 8 wherein said hitch comprises a hitch bar carried by said front transverse trailer frame member of said trailer frame, a rotational coupler carried by said hitch bar, a coupling member carried by said rotational coupler and a hitch eye carried by said coupling member.

11. A cargo trailer, comprising:
an elongated trailer frame having a longitudinal axis;
a first wheel mount arm and a second wheel mount arm pivotally carried by the trailer frame;
an arm attachment sleeve carried by the first wheel mount arm and the second wheel mount arm, respectively, and wherein the trailer frame extends through the arm attachment sleeve of the first wheel mount arm and the second wheel mount arm, respectively;
an arm spring interposed between the trailer frame and the first wheel mount arm and the second wheel mount arm, respectively;
a first wheel carried by the first wheel mount arm and a second wheel carried by the second wheel mount arm;
a pair of cargo container mount members carried by the trailer frame and positionally adjustable along the longitudinal axis of the trailer frame;
a hitch carried by the trailer frame; and
a hitch support frame carried by the trailer frame and wherein the hitch is supported by the hitch support frame, the hitch support frame comprising a pair of side support frame members carried by the hitch support frame and a cross member extending between the pair of side support frame members.

\* \* \* \* \*